United States Patent [19]

Miyashita

[11] Patent Number: 4,487,390

[45] Date of Patent: Dec. 11, 1984

[54] VEHICULAR SEAT HEIGHT ADJUSTING DEVICE

[75] Inventor: Norio Miyashita, Tokyo, Japan

[73] Assignee: Honda Giken Kogyo Kabushiki Kaisha, Tokyo, Japan

[21] Appl. No.: 424,594

[22] Filed: Sep. 27, 1982

[30] Foreign Application Priority Data

Mar. 15, 1982 [JP] Japan .................. 57-40562

[51] Int. Cl.³ ............................................ F16M 13/00
[52] U.S. Cl. .................................... 248/396; 248/421; 297/313
[58] Field of Search ............... 248/371, 372.1, 393, 248/394, 395, 396, 397, 398, 419, 421; 297/313, 325, 329

[56] References Cited

U.S. PATENT DOCUMENTS

| 2,235,237 | 3/1941 | Saunders et al. | 248/419 |
| 2,302,387 | 11/1942 | Greeno et al. | 248/371 X |
| 3,079,118 | 2/1963 | Pickles | 248/421 X |
| 3,314,637 | 4/1967 | Fudala | 248/421 |
| 4,385,743 | 5/1983 | Werner | 248/393 |

FOREIGN PATENT DOCUMENTS

| 2616802 | 12/1976 | Fed. Rep. of Germany | 248/396 |
| 1027851 | 4/1966 | United Kingdom | 297/313 |
| 2041738 | 9/1980 | United Kingdom | 248/396 |

Primary Examiner—J. Franklin Foss
Assistant Examiner—David L. Talbott
Attorney, Agent, or Firm—Lyon & Lyon

[57] ABSTRACT

A seat height adjusting device has a first link pivotally connected at its lower end to a support member and pivotally connected at its upper end to a front portion of the seat. A device is provided for turning the link about its lower pivotal connection for raising and lowering the front portion of the seat. A second link is pivotally at its lower end to the same support member, and a pin-and-slot lost motion connection is provided between the second link and the member fixed to the seat. Releasable means are provided to maintain the pin at one end of the slot so that the first and second links are held in substantially parallel relationship.

6 Claims, 9 Drawing Figures

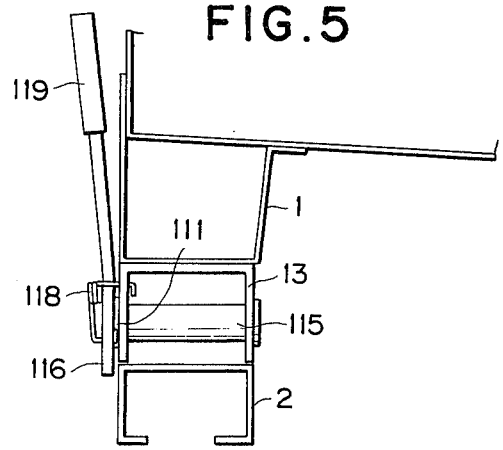
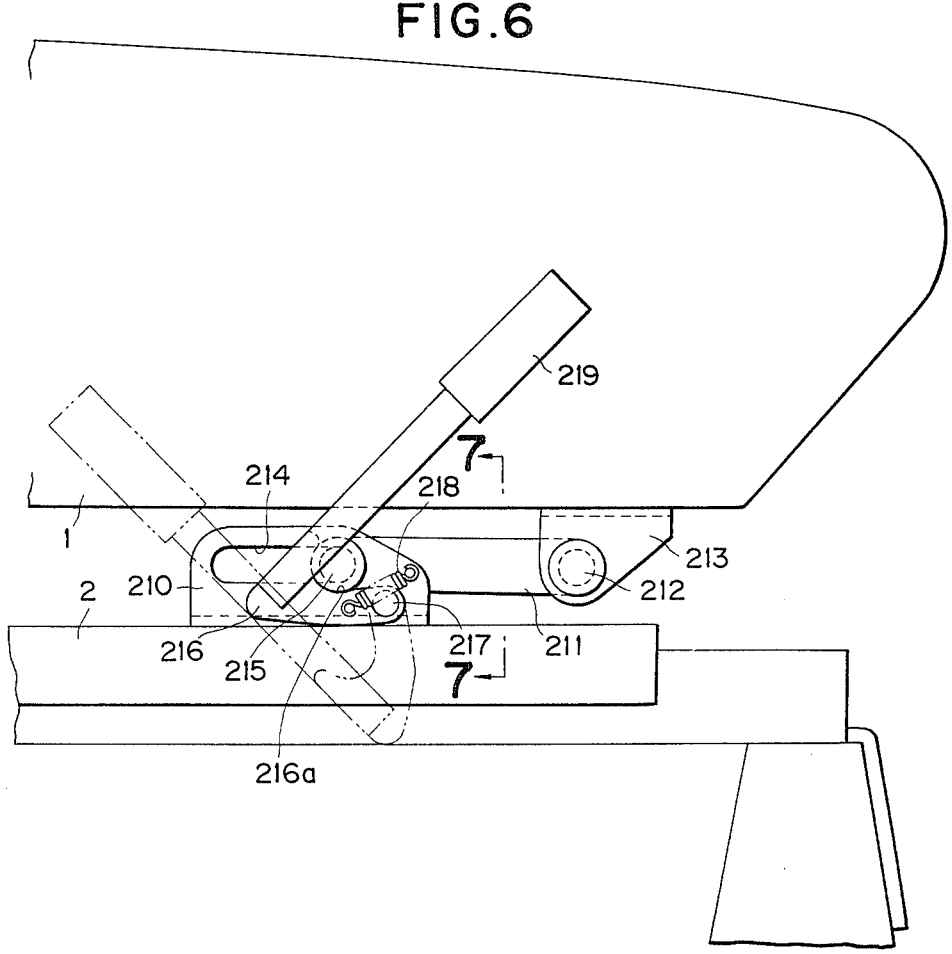

VEHICULAR SEAT HEIGHT ADJUSTING DEVICE

BACKGROUND OF THE INVENTION

The present invention relates to a vehicular seat height adjusting device and more particularly to an adjusting device wherein a vertical adjustment for the entirety of a seat and a vertical adjustment for only the front portion of the seat can be effected by only a single mechanism.

In prior vertical height adjusting systems for a vehicular seat, the function of the so-called height adjustment for moving the height of the seat vertically in the same amount in both front and rear portions, that is, for moving the seat vertically in parallel, required a first mechanism. The function of the so-called lift adjustment for vertically moving only the front portion of the seat required a second mechanism. This resulted in increase in the number of parts and in size of the entire mechanism as well as a more complicated structure. Besides, the selection, switching and operation for both such mechanisms are not fully satisfactory in point of reliability. In general, therefore, only one of the two functions has been provided in many cases.

The present invention remedies such drawbacks.

SUMMARY OF THE INVENTION

According to the present invention, there is provided a vehicular seat height adjusting device comprising a vertical height adjusting mechanism for a seat attached to a lower part of the front portion of the seat, a link connecting a lower part of the rear portion of the seat to the vehicular body side, and a device for rendering the link operative or non-operative, whereby a vertical height adjustment for the entire seat and an inclination adjustment for the seat involving a vertical movement of the front portion of the seat can be accomplished selectively. The device may include an engaging pin attached to one end of the link, a guide portion for the engaging pin provided on either the seat side, link and vehicular body side, and a locking device capable of selectively preventing the movement of the engaging pin. The locking device restricts or releases the movement of the pin, for permitting height adjustment and lift adjustment for the seat selectively.

It is an object of the present invention to provide a vehicular seat height adjusting device wherein the two adjusting functions for the seat can be attained by a single mechanism and constructed simply by using a minimum number of parts.

Preferred embodiments of the present invention will be described in detail hereinunder with reference to the accompanying drawings, for which further features, objects and advantages of the present invention will become apparent.

BRIEF DESCRIPTION OF THE DRAWINGS

The accompanying drawings illustrate embodiments of the present invention, in which:

FIG. 5 is a rear view taken along the direction of the arrow 5 shown in FIG. 4.

FIG. 6 is a side view of a principal portion according to a third embodiment of the present invention.

DETAILED DESCRIPTION OF THE EMBODIMENTS

In the following description, the term "height adjustment" means a vertical adjustment for the entirety of a seat, and the term "lift adjustment" means a vertical adjustment for the front portion of the seat.

Figure 1:
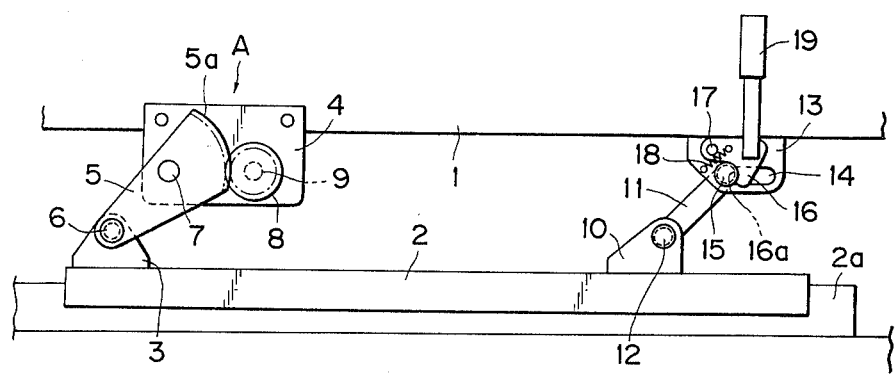
FIG. 1 is a side view showing a height adjusting device according to a preferred embodiment of the present invention.
Figure 2:
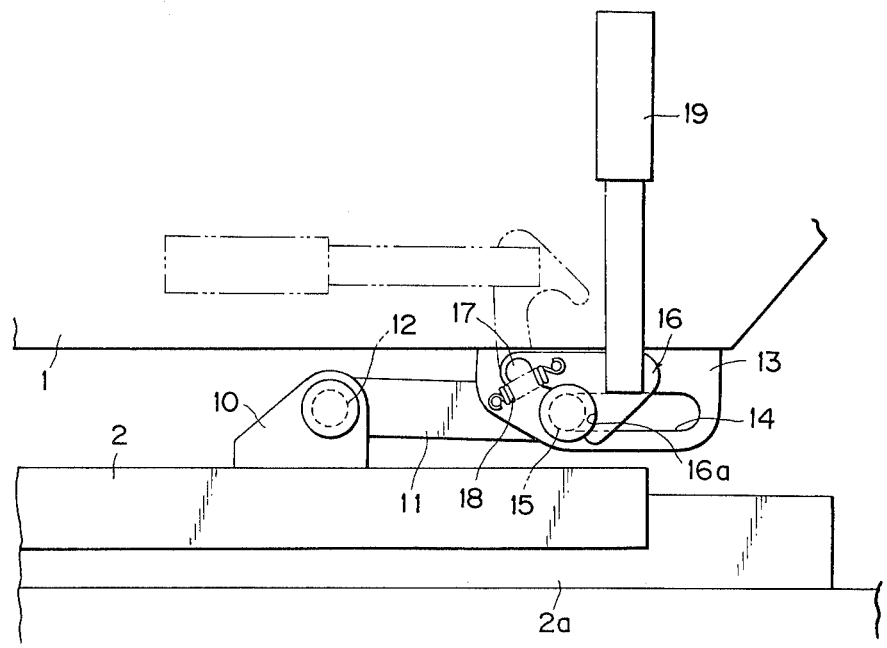
FIG. 2 is an enlarged view of a rear portion of the mechanism shown in FIG. 1.
Figure 3:
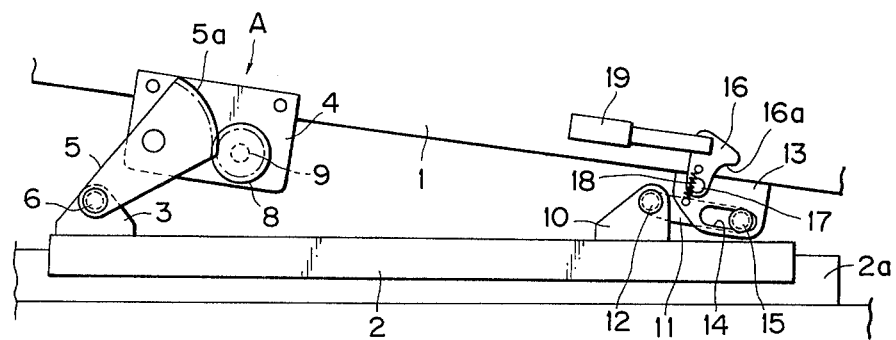
FIG. 3 illustrates a lift adjusting position.

Referring first to FIGS. 1 through 3, the reference numeral 1 designates a seat cushion frame covered with a cushioning material and a cover material. On the rear portion of the seat cushion on the right-hand side in the figures, there stands up a seat back (not shown) capable of being raised up and brought down and adjustable in its rising angle. Numeral 2 designates an upper rail engaged with the floor on the vehicular body side positioned under the seat cushion or with a seat slide lower rail 2a mounted on the floor as shown in the illustrated embodiment wherein the seat is adjustable in the longitudinal direction.

Seat upper rails 2 are provided on either side in the transverse direction on the vehicle floor. On the front portion of each of the rails 2 on the left-hand side in the figures is mounted an upright bracket 3. Depending downward from the upper portion of the seat cushion frame 1 is a bracket 4. The lower end of a link 5 is pivotally secured to the bracket 3 through a pin 6, a middle point of the link 5 is pivoted to the bracket 4 through a pin 7, and the upper end of the link 5 is formed as a sector on which are formed teeth 5a to provide a sector gear shape. A pinion 8 is pivoted to the bracket 4 by a pin 9 and it is brought into engagement with the teeth 5a formed at the upper end of the link 5. The pivot pin 9 and hence the pinion 8 can be rotated by an operating lever (not shown), whereby the link 5 is pivotally moved about the pin 6, thus causing the seat to move in the vertical direction with respect to the rail 2 on the fixed side. When the seat reaches a predetermined height after operation with the lever, it is locked by a suitable locking mechanism and thus it maintains the adjusted height.

On the rear portion of each of the right and left rails 2 is mounted an upright bracket 10, to which is pivotally secured the lower end of a link 11 by means of a pin 12. From the rear portion of the seat cushion frame 1 there depends downward a rear bracket 13 in which is formed a longitudinal slot 14 serving as a movement guide portion, with a pin 15 attached to the upper end of the link 11 being slidably engaged with the slot 14. To the bracket 13 on the frame 1 side is pivotally secured by pin 17 the base portion of a generally inverted L-shaped hook-like locking plate 16. This locking plate has an arcuate engaging portion 16a which engages part of the outer periphery of the pin 15. The base portion of the locking plate 16 and the bracket 13 are interconnected through a moderation spring 18 interposed therebetween, and an operating lever 19 is fixed to the locking plate 16. The locking plate 16 is mounted on the right and left brackets, while the operating lever 19 is attached to one of the locking plates 16. Both locking plates 16, which are interconnected through a rod (not shown) or the like, are constructed so that when one is operated, both pivot about the pin 17.

Now the function and effect will be described. FIGS. 1 and 2 both show the locked position, wherein the lever 19 stands upright and the plate 16 is turned so that its engaging portion 16a engages part of the outer periphery of the pin 15 which is movable within the slot 14, thereby restricting the movement of the pin 15 within the slot 14. In this position of the rear parts, therefore, if a front height adjusting mechanism A is operated in the vertical direction as previously described, the link 11 constitutes a parallel link mechanism together with the link 5 because its movement is restricted at both ends thereof, so that the front and rear portions of the seat move vertically in an equal amount to adjust the height of the seat. An upper limit of the movement is shown in FIG. 1, while a lower limit of the movement is shown in FIG. 2, with respect to only the rear link portion.

If the lever 19 is brought down forward as shown in phantom lines in FIG. 2, the plate 16 stands up on the pin 17 as a fulcrum, so that the plate 16 is disengaged from the pin 15 of the link 11 and the pin 15 becomes slidable within the slot 14. In this condition, if the front portion of the seat is moved upward by operating the front height adjusting mechanism A, the pin 15 moves within the slot 14 and the link 11 is turned in a clockwise direction as the pin 15 moves, without being restricted in its movement. With the pin 15 in such a free state acting as a fulcrum, only the front portion moves in the vertical direction, and thus the lift adjustment is effected, as shown in FIG. 3.

Thus, a single mechanism is provided for adjusting both front and rear portions of the seat, and the height and lift adjustments can be made selectively by restricting, locking and unlocking the movement of the rear pin. Besides, a simple structure including link connections and pin and slot engagement supplies the selective adjusting mechanism.

Figure 4:
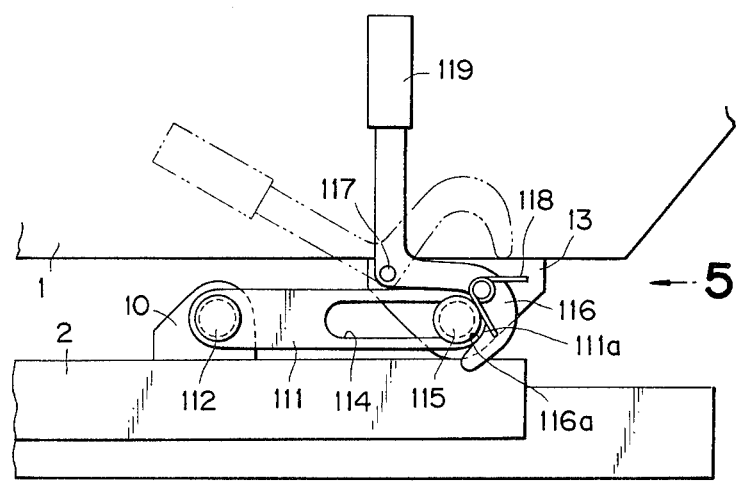
FIG. 4 is a side view of a principal portion according to a second embodiment of the present invention.

Referring now to FIGS. 4 and 5, a bracket 10 is mounted upright on the rear portion of a seat upper rail 2, and one end of a link 111 is pivotally secured to the bracket 10 by a pin 112. In the link 111 is formed a longitudinal slot 114 which extends from near the other end of the link 111 up to an intermediate part. A pin 115 is mounted on a bracket 13 which depends downward from the rear portion of a seat cushion frame 1, and the pin 115 is engaged with the slot 114 of the link 111. A locking plate 116 is pivotally secured to the bracket 13 by means of a pin 117, and an engaging portion 116a of the plate 116 is formed to match the external shape of the other end portion 111a of the link 111. Integral with the base portion of the plate 116 is a lever 119. Furthermore, the plate 116 and the bracket 13 are interconnected through a moderation spring 118.

In this form of the invention, if the lever 119 is allowed to stand upright, the plate 116 comes down, thereby allowing its engaging portion 116a to engage the end portion of the link 111 to restrict the movement of the pin 115 of the bracket 13 within the slot 114. Upon operation of a front height adjusting mechanism of the same construction as shown in the first embodiment, the link 115 functions as a parallel linkage device because both ends thereof are restricted, and in this way the height adjustment is performed. If the lever 119 is brought down as shown in phantom lines, the locking plate 116 is disengaged from the other end portion 111a of the link 111, so the link 111 becomes free in its movement within the range of the slot 114 with respect to the fixed side pin 115. Consequently, in the same way as previously noted, the lift adjustment involving a vertical movement of only the front portion of the seat can be effected.

Figure 7:
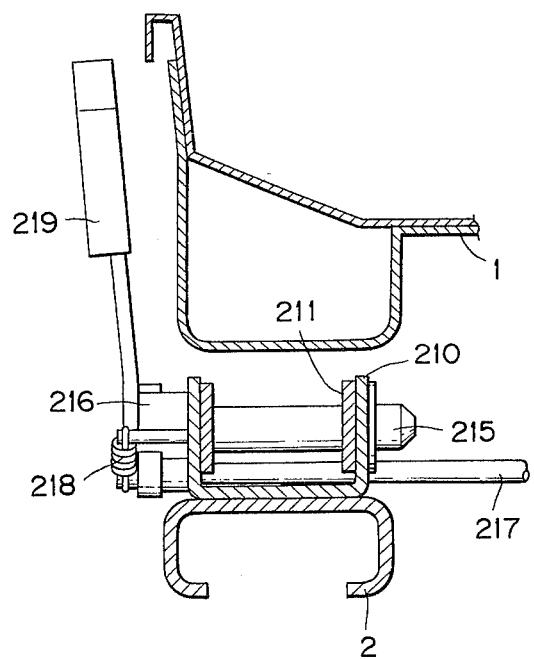
FIG. 7 is a sectional view taken on line 7—7 of FIG. 6.

Referring now to FIGS. 6 and 7, a bracket 210 is mounted upright on the rear portion of a seat lower rail 2, and a longitudinal slot 214 is formed therein. Dependent from the rear portion of a seat cushion frame 1 is a bracket 213, to which is pivoted one end of a link 211 by means of a pin 212. Projecting from the other end of the link 211 is a pin 215 which engages the slot 214 in the rail side bracket 210. The base end of a locking plate 216 is pivotally secured to the bracket 210 by pin 217, and this bracket and the base end portion of the locking plate are interconnected through a moderation spring 218, with a lever 219 being connected to the front end portion of the locking plate 216.

In this form of the invention, when the lever 219 is in a rearward inclined position shown in FIG. 6, engaging portion 216a of the locking plate 216 restricted movement of the pin 215, so that when the front portion of the seat is moved vertically, the link 211 functions as a parallel linkage device while the pins at both ends thereof are restrained, thus permitting the height adjustment, in the same way as previously described. If the lever 219 is brought down forwardly, as shown by the phantom lines, the locking plate 216 is disengaged from the pin 215. The pin 215 becomes free in its movement along the slot 214 of the rail side bracket 210, thus permitting the lift adjustment involving a vertical movement of only the front portion to be performed in the same way as previously described.

Figure 8:
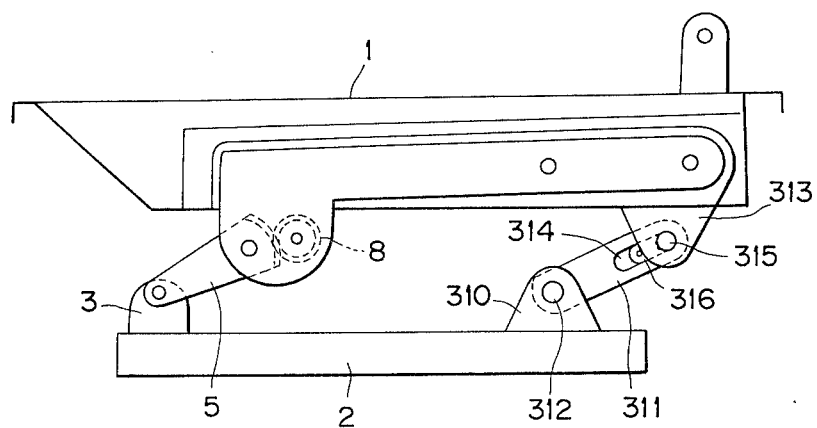
FIG. 8 is a side view showing a modification.
Figure 9:
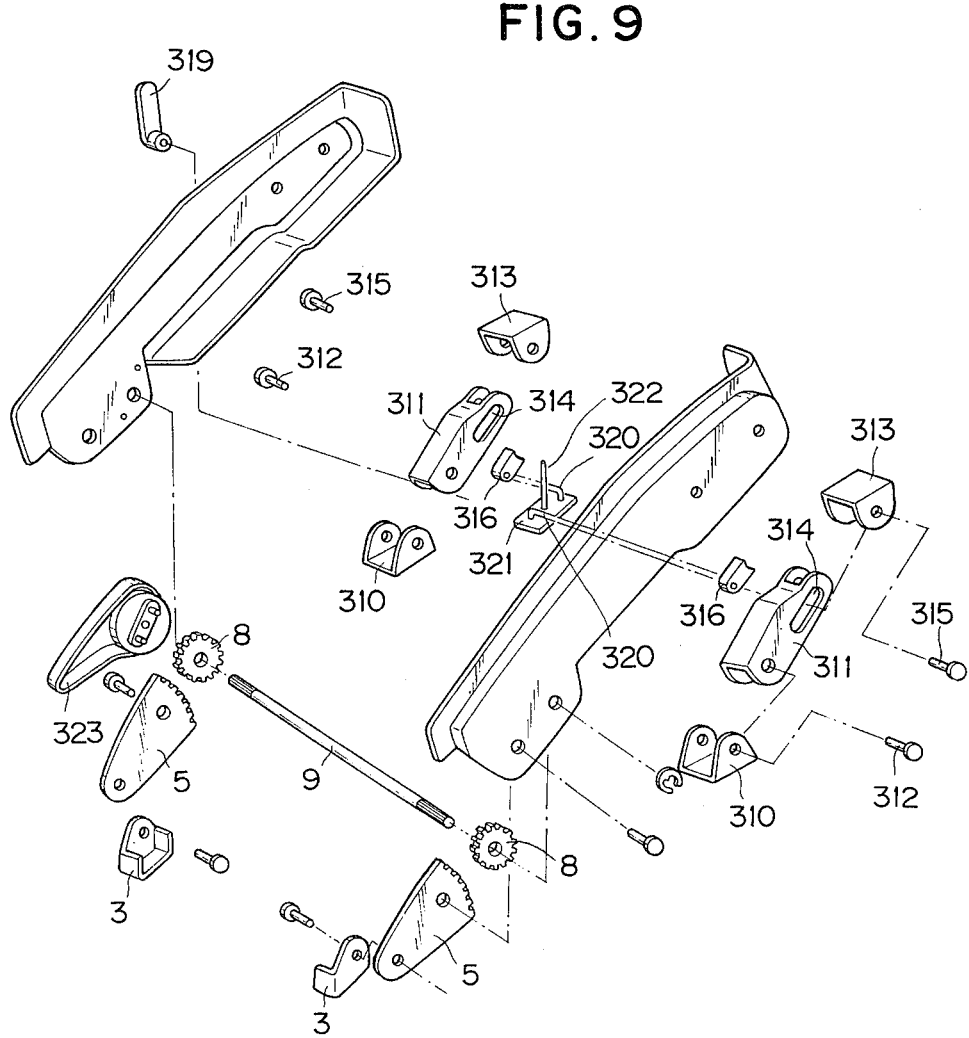
FIG. 9 is an exploded perspective view thereof.

Referring now to FIGS. 8 and 9, there is shown a modification of a locking mechanism, wherein a slot 314 is formed in a link 311 having one end pivoted by a pin 312 to a bracket 310 mounted on the rail side. A pin 315 of a bracket 313 mounted on the seat cushion side is brought into engagement with the slot 314. A locking piece 316 is fitted to move into and out of the slot 314. The locking pieces 316, which are provided for each of right and left links, are each connected to an equalizer 321 through rods 320. The equalizer 321 is moved pivotally in a horizontal plane by an operating shaft 322 to push and pull the right and left rods 320 in an equal amount, thereby moving the locking pieces 316 to advance and retract with respect to the slot 314. When advanced, the movement of the pins 315 is restricted, and when retracted the pins 315 move free. The operating shaft 322 is operated by a lever 319. In this way the height and lift adjustments are accomplished. Numerals 3 and 4 designate lower and upper brackets, respectively, at the front portion of the seat; numeral 5 designates a link; 8 a pinion; 9 an operating shaft; and 323 an operating handle for the pinion 8.

Embodiments of the present invention have been described hereinabove, but the vehicular seat height adjusting device of the present invention may be constructed in such a manner that a link is pivoted to the seat side and a slot is formed in the link and it is brought into engagement with a bracket mounted on the seat cushion frame side to restrict the movement of the link. Moreover, although in the hereinabove described embodiment a link was disposed between the seat cushion frame and the rail, an end of the link may be engaged or pivoted directly onto the floor.

According to the present invention, as set forth hereinabove, both height adjustment and lift adjustment can be done selectively by a single mechanism, and the two functions can be attained by simple structure and mechanism and using a minimum number of parts.

Having fully described my invention, it is to be understood that I am not to be limited to the details herein set forth but that my invention is of the full scope of the appended claims.

I claim:

1. Apparatus for adjusting the height of a seat with respect to the body of a vehicle, comprising, in combination: a first link pivotally connected at its lower end to a support member on the body and pivotally connected at its upper end to a front portion of the seat, means for turning said link about its lower pivotal connection for raising and lowering the front portion of the seat, a member fixed to the rear portion of the seat and provided with a slot, a second link pivotally connected at its lower end to said support member and having a pin at its upper end received in said slot, and releasable means for maintaining the pin at one end of the slot, in which position the first and second links are maintained in substantially parallel relationship for raising and lowering the seat uniformly upon turning of said first link and only raising and lowering the front portion of the seat upon actuation of said releasable means to allow movement of said pin in said slot.

2. Apparatus for adjusting the height of a seat with respect to parallel rails carried on the body of a vehicle comprising, in combination: a first pair of links each pivotally connected at its lower end to one of said rails and at its upper end to a front portion of the seat, means for turning said first pair of links about their lower pivotal connections for raising and lowering the front portion of the seat, a pair of members fixed to the rear portion of the seat and each provided with a slot, a second pair of links pivotally connected at their lower ends to said rails and each having a pin at the other end received in the slots of said members, releasable means for maintaining at least one of the pins at the end of its slot, in which position the first and second pairs of links are maintained in substantially parallel relationship for raising and lowering the seat uniformly upon turning of said first pair of links, and said releasable means being operable to allow movement of said pins in said slots for only raising and lowering the front portion of the seat upon turning of said first pair of links.

3. Apparatus for adjusting the height of a seat with respect to the body of a vehicle, comprising, in combination: a first link pivotally connected at its lower end to a support member on the body and pivotally connected at its upper end to a front portion of the seat, means for turning said link about its lower pivotal connection for raising and lowering the front portion of the seat, a member fixed to the rear portion of the seat, a second link pivotally connected at its lower end to said support member, a lost motion connection between said member and said second link, and releasable means having positions for selectively allowing or preventing relative movement at said lost motion connection, in said motion allowing position the front portion only of said seat is raised and lowered upon turning of said first link and in said motion preventing position the first and second links are maintained in substantially parallel relationship for raising and lowering the seat uniformly upon turning of said first link.

4. The combination set forth in claim 3 in which said lost motion connection includes a slot in said member and a pin on said second link, and said releasable means includes a locking plate pivoted on said member and engageable with said pin.

5. Apparatus for adjusting the height of a seat with respect to parallel rails carried on the body of a vehicle comprising, in combination: a first pair of links each pivotally connected at its lower end to one of said rails and at its upper end to a front portion of the seat, means for turning said first pair of links about their lower pivotal connections for raising and lowering the front portion of the seat, a pair of members fixed to the rear portion of the seat, a second pair of links pivotally connected at their lower ends to said rails, pin-and-slot lost motion connections between said members and the links in said second pair, and releasable means for maintaining at least one of the pins at the end of its slot, in which position the first and second pairs of links are maintained in substantially parallel relationship for raising and lowering the seat uniformly upon turning of said first pair of links, and said releasable means being operable to allow movement of said pins in said slots for only raising and lowering the front portion of the seat upon turning of said first pair of links.

6. Apparatus for adjusting the height of a seat with respect to the body of a vehicle, comprising, in combination: a first link pivotally connected at its lower end to a support member on the body and pivotally connected at its upper end to a front portion of the seat, means for turning said link about its lower pivotal connection of raising and lowering the front portion of the seat, a member fixed to the rear portion of the seat and provided with a pin, a second link pivotally connected at its lower end to said support member and having a slot receiving said pin, and a retractable lock piece for maintaining the pin at one end of the slot, in which position the first and second links are maintained in substantially parallel relationship for raising and lowering the seat uniformly upon turning of said first link, said retractable lock piece being operable to allow movement of said pin in said slot to cause raising and lowering of only the front portion of the seat upon turning of said first link.

* * * * *